US 008370360B2

(12) United States Patent
Mo

(10) Patent No.: US 8,370,360 B2
(45) Date of Patent: Feb. 5, 2013

(54) MERCHANDISE RECOMMENDING SYSTEM AND METHOD THEREOF

(75) Inventor: Yeong Il Mo, Seoul (KR)

(73) Assignee: G & G Commerce Ltd., Seoul (KR)

( * ) Notice: Subject to any disclaimer, the term of this patent is extended or adjusted under 35 U.S.C. 154(b) by 741 days.

(21) Appl. No.: 11/617,875

(22) Filed: Dec. 29, 2006

(65) Prior Publication Data

US 2007/0168357 A1    Jul. 19, 2007

(30) Foreign Application Priority Data

Dec. 31, 2005   (KR) .................. 10-2005-0136224
Dec. 19, 2006   (KR) .................. 10-2006-0129744

(51) Int. Cl.
*G06F 7/00*    (2006.01)
*G06F 17/30*   (2006.01)

(52) U.S. Cl. ................... 707/738; 707/740; 707/771
(58) Field of Classification Search ................ None
See application file for complete search history.

(56) References Cited

U.S. PATENT DOCUMENTS

| 6,070,149 | A * | 5/2000 | Tavor et al. ............. 705/26 |
| 7,092,782 | B2 * | 8/2006 | Lee ..................... 700/132 |
| 7,398,231 | B2 * | 7/2008 | Wan et al. .............. 705/26 |
| 8,078,615 | B2 * | 12/2011 | Smith et al. ............ 707/732 |
| 2002/0143622 | A1 * | 10/2002 | Taliercio et al. ........ 705/14 |
| 2002/0184107 | A1 * | 12/2002 | Tsuda et al. ............ 705/26 |
| 2003/0065578 | A1 * | 4/2003 | Peyrelevade et al. ...... 705/26 |
| 2004/0246250 | A1 * | 12/2004 | Kaku et al. ............. 345/419 |
| 2005/0251409 | A1 * | 11/2005 | Johnson et al. .......... 705/1 |
| 2005/0253840 | A1 * | 11/2005 | Kwon .................... 345/419 |
| 2006/0031128 | A1 * | 2/2006 | Lamitie ................. 705/26 |
| 2006/0059054 | A1 * | 3/2006 | Adiseshan .............. 705/26 |
| 2007/0150368 | A1 * | 6/2007 | Arora et al. ............ 705/26 |
| 2007/0225859 | A1 * | 9/2007 | Kolesnychenko et al. ... 700/216 |
| 2008/0255920 | A1 * | 10/2008 | Vandergriff et al. ..... 705/10 |
| 2009/0157323 | A1 * | 6/2009 | Jung et al. ............. 702/19 |

OTHER PUBLICATIONS

IST World: FashionMe: Fashion Shopping with Individualized Avatars http://cordis.europa.eu/data/proj_fp5/actioneq, Jan. 1, 2000.*

* cited by examiner

*Primary Examiner* — Cheryl Lewis
*Assistant Examiner* — Raheem Hoffler
(74) *Attorney, Agent, or Firm* — Edwards Wildman Palmer LLP

(57) ABSTRACT

The present invention relates to a merchandise recommending system, and it is an object of the present invention is to derive recommended merchandise through a multiple image search, in which image characteristic information is extracted through a text search or an image search, thereby deriving recommended merchandise. To accomplish the above object, according to one aspect of the present invention, there is provided an operator server comprising a data receiving unit for receiving a 'merchandise search request signal' containing a text search or an image search (request) from the user computer and receiving a unique identification number of each user input information and merchandise information together with a corresponding matching table from the manager computer, a matching process module unit for sequentially arranging images by performing a command processing on search keywords that are searched through the characteristic information extraction module unit, a merchandise recommendation module unit for deriving recommended merchandise using the image characteristic information according to a search result, a data transmission unit for transmitting the merchandise extracted through the merchandise recommendation module unit to the user computer, and a data storage unit stores the user input information, merchandise information, unique identification numbers, and matching table.

11 Claims, 18 Drawing Sheets

FIG. 7a

| MAIN SCREEN | RECOMMENDED MERCHANDISE | COORDINATION | SEND MAIL | CONVERT APPAREL | REGISTER PATTERN | REGISTER MERCHANDISE | REGISTER SILHOUETTE | LOGOUT |

208 — · REGISTER PATTERN | [SEARCH]
— REGISTER SIZE: LARGER THAN 400 PIXELS IN WIDTH, 550 PIXELS IN HEIGHT

210 —
· PATTERN TYPE

☐ SOLID  ☐ STRIP  ☐ CHECK  ☐ DOT  ☐ GEOMETRY
☐ POP ART  ☐ OPTICAL ART  ☐ ANIMAL  ☐ NATURAL  ☐ DYE
☐ TRADITIONAL SYMBOL  ☐ GRAFFITI  ☐ MIXED  ☐ OTHERS

· PATTERN TYPE
☐ SMALL  ☐ MEDIUM  ☐ LARGE

212 —
☐ MAIN TARGET
· GENDER | ○ MALE  ○ FEMALE  ○ FOR BOTH SEX
· AGE | ☐ 0~2  ☐ 3~7  ☐ 8~13
        ☐ 17~19  ☐ 20~23  ☐ 24~29
        ☐ 40~49  ☐ 50~59  ☐ 60

[REGISTER] [RE-REGISTER] [EXIT]

MERCHANDISE RECOMMENDING SYSTEM AND METHOD THEREOF

BACKGROUND OF THE INVENTION

1. Field of the Invention

The present invention relates to a merchandise recommending system, and more particularly, to a merchandise recommending system for deriving recommended merchandise through a multiple image search and a method thereof, in which image characteristic information is extracted through a text search or an image search, thereby deriving recommended merchandise.

2. Background of the Related Art

Techniques related to a conventional merchandise recommending system include Korea Laid-open Patent No. 2005-0017534 (Custom tailored apparel recommending system using avatar apparel purchase information, hereinafter, referred to as a "prior art"), and a plurality techniques has been patent applied and registered.

The custom tailored apparel recommending system of the prior art comprises, as shown in FIG. 1, an Internet server for driving and managing an Internet site that provides avatar decoration services and apparel recommendation services to users, a shopping mall apparel information collection server for collecting apparel merchandise information on apparel sold at a plurality of Internet apparel shopping malls operating on the Internet, an avatar apparel information management server for collecting avatar apparel purchase information according to use of the avatar decoration services, an apparel recommendation server for providing the apparel recommendation services that analyzes apparel purchase preference of avatar decoration service users who use the avatar apparel purchase information, searches for apparel that is closely related to the apparel purchase preference from the apparel merchandise information, and recommends real apparel that is suitable for user's taste, and a database for storing the avatar apparel purchase information, apparel merchandise information, and apparel purchase preference information.

As described above, if a user purchases avatar apparel on the Internet to decorate an avatar to be looked like him or herself, the prior art provides custom tailored apparel recommendation services suitable for the user through the avatar apparel purchase information. However, since the user is recommended with apparel according thereto after decorating the avatar, there is a problem in that the range of apparel that the user can select is limited only to avatar apparel.

In addition, in the prior art, since user's apparel preference can be confirmed only through the avatar apparel purchase information, the avatar decoration services should be used in order to provide the custom tailored apparel recommendation services, and thus there is a problem in that additional costs and time are required.

Meanwhile, although an avatar presently used in cyberspace represents a user in the cyberspace, the user is represented through icons including accessories, apparel, or the like rather than being realistically represented through the user's body shape, tastes, and features. Therefore, even though the user is recommended with apparel suitable for the user's taste based on the avatar apparel, it cannot be determined whether the recommended apparel is suitable for the user (buyer).

In other words, there is a problem in that although the user purchases apparel based on the user's preference, it cannot be confirmed in advance whether the purchased apparel is suitable for the user's body shape.

SUMMARY OF THE INVENTION

Therefore, the present invention has been made in view of the above problems, and it is a first object of the present invention to extract image characteristic information through a text search or an image search, thereby deriving recommended merchandise.

It is a second object of the present invention to allow a user (buyer) to easily confirm the suitability of the merchandise recommended through an avatar that represents the user's body shape.

It is a third object of the present invention to perform a stacking process so that the recommended merchandise extracted based on the image characteristic information can be sequentially derived in order of priority.

BRIEF DESCRIPTION OF THE DRAWINGS

The above and other objects, features and advantages of the present invention will be apparent from the following detailed description of the preferred embodiments of the invention in conjunction with the accompanying drawings, in which:

Figure 7A:
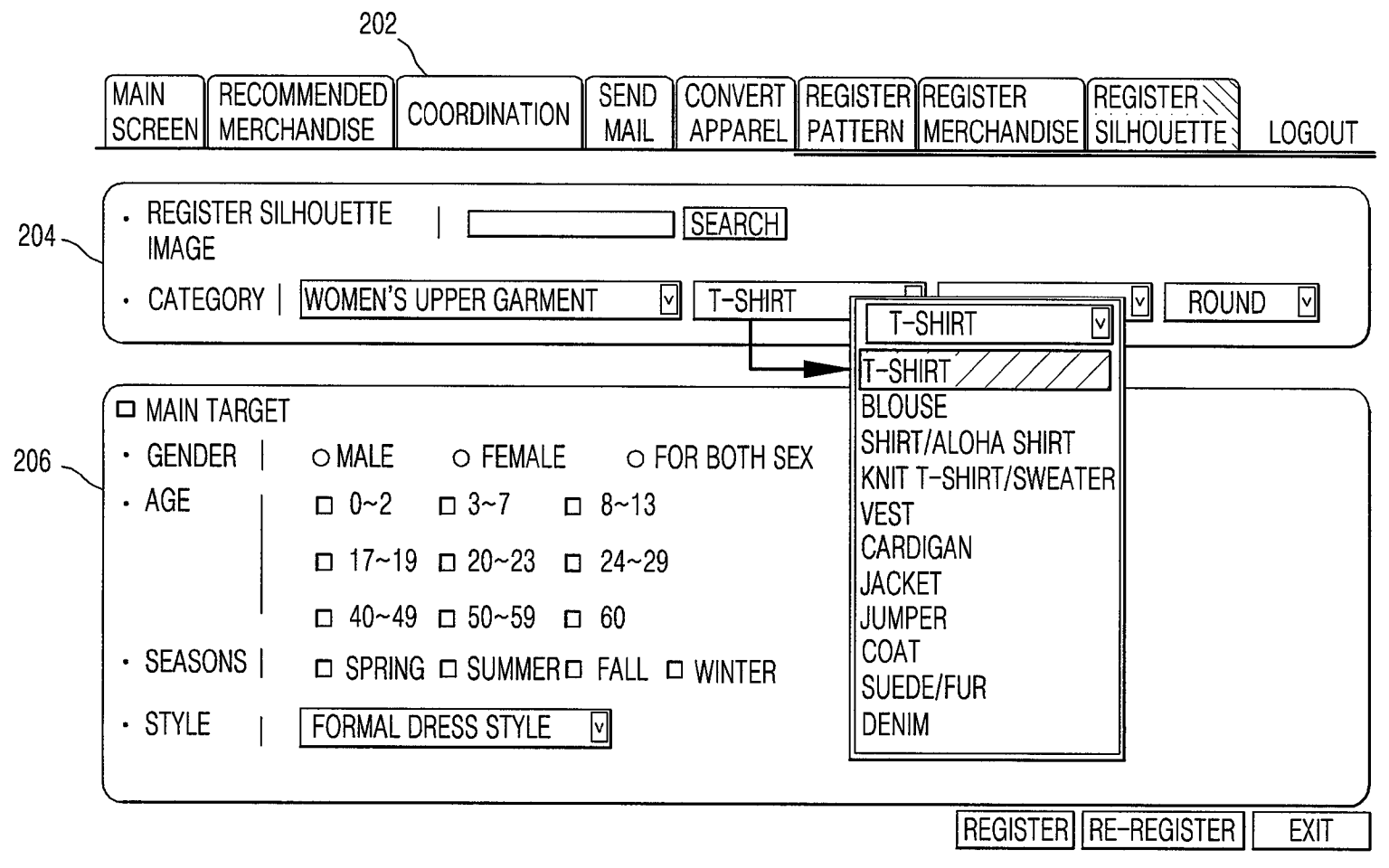

FIG. 7a is a view showing a silhouette image registration tool according to a first embodiment of the present invention;

FIG. 9 is a view showing a pattern image registration tool according to a first embodiment of the present invention;

Figure 10:
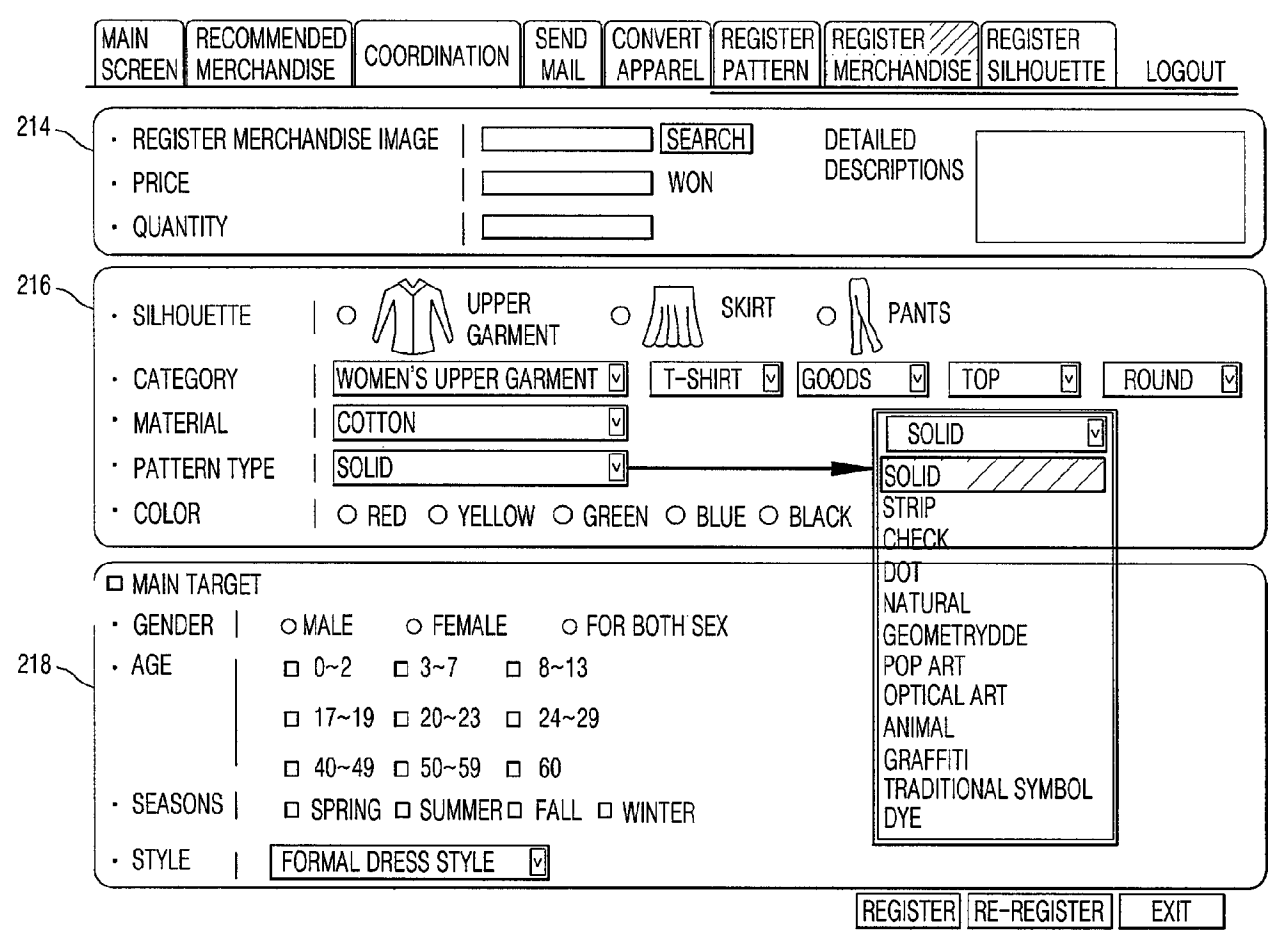

FIG. 10 is a view showing a merchandise registration tool according to a first embodiment of the present invention;

DETAILED DESCRIPTION OF THE PREFERRED EMBODIMENT

The features and merits of the present invention will become clear through the following detailed descriptions of preferred embodiments with reference to the accompanying drawings. The terms and words used in the entire specification and the claims must be interpreted as the meanings and concepts conforming to the technical spirit of the present invention based on the principle that the inventor(s) can appropriately define terms in order to explain their invention in the best way. In addition, in the following description, it is noted the detailed description on known function and constructions unnecessarily obscuring the subject matter of the present invention will be avoided hereinafter.

The merchandise recommending system according to a first embodiment of the present invention will be described with reference to FIGS. 2a to 3.

Figure 1:
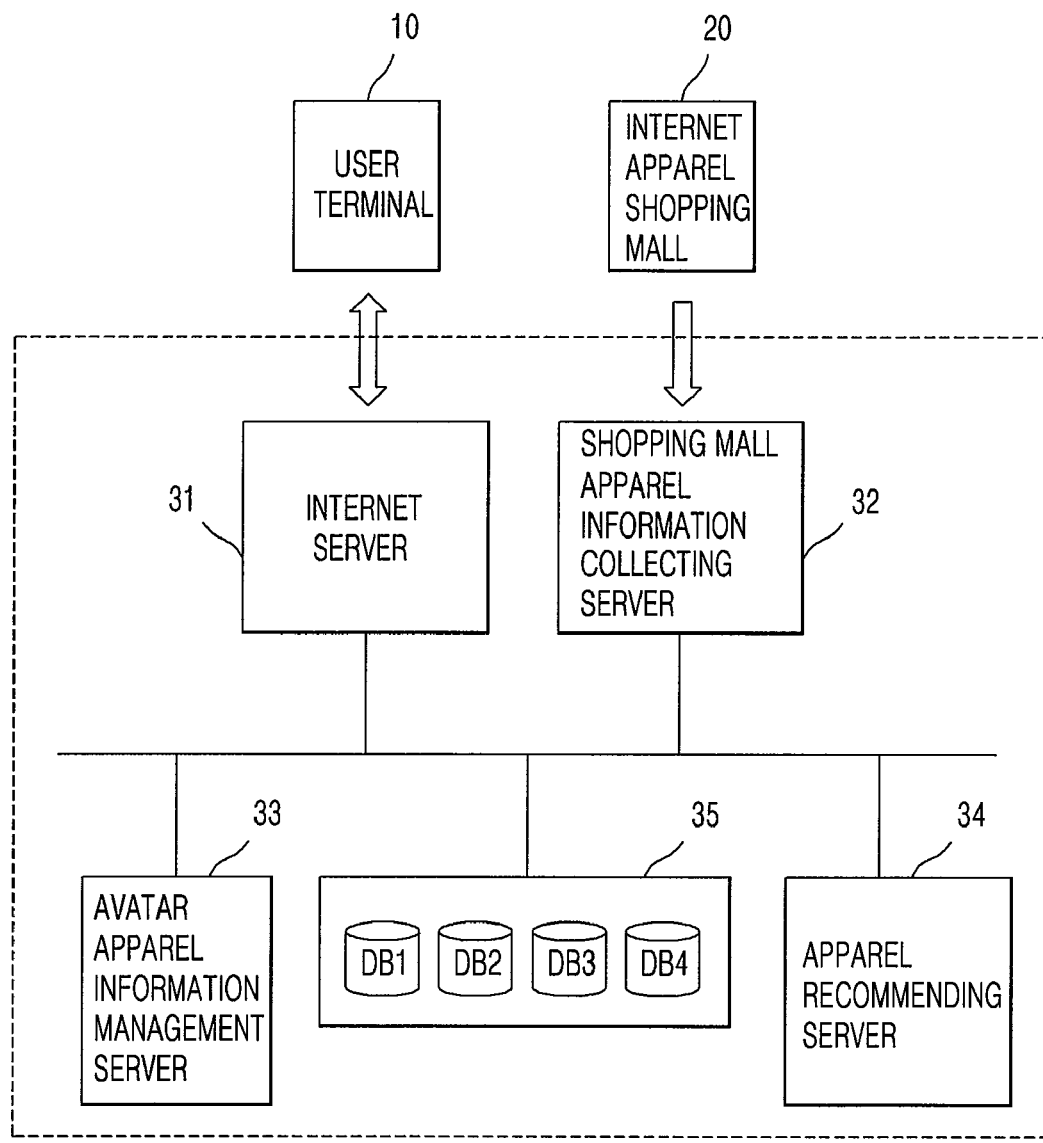
FIG. 1 is a view showing the configuration of a conventional custom tailored apparel recommending system using avatar apparel purchase information.
Figure 2A:
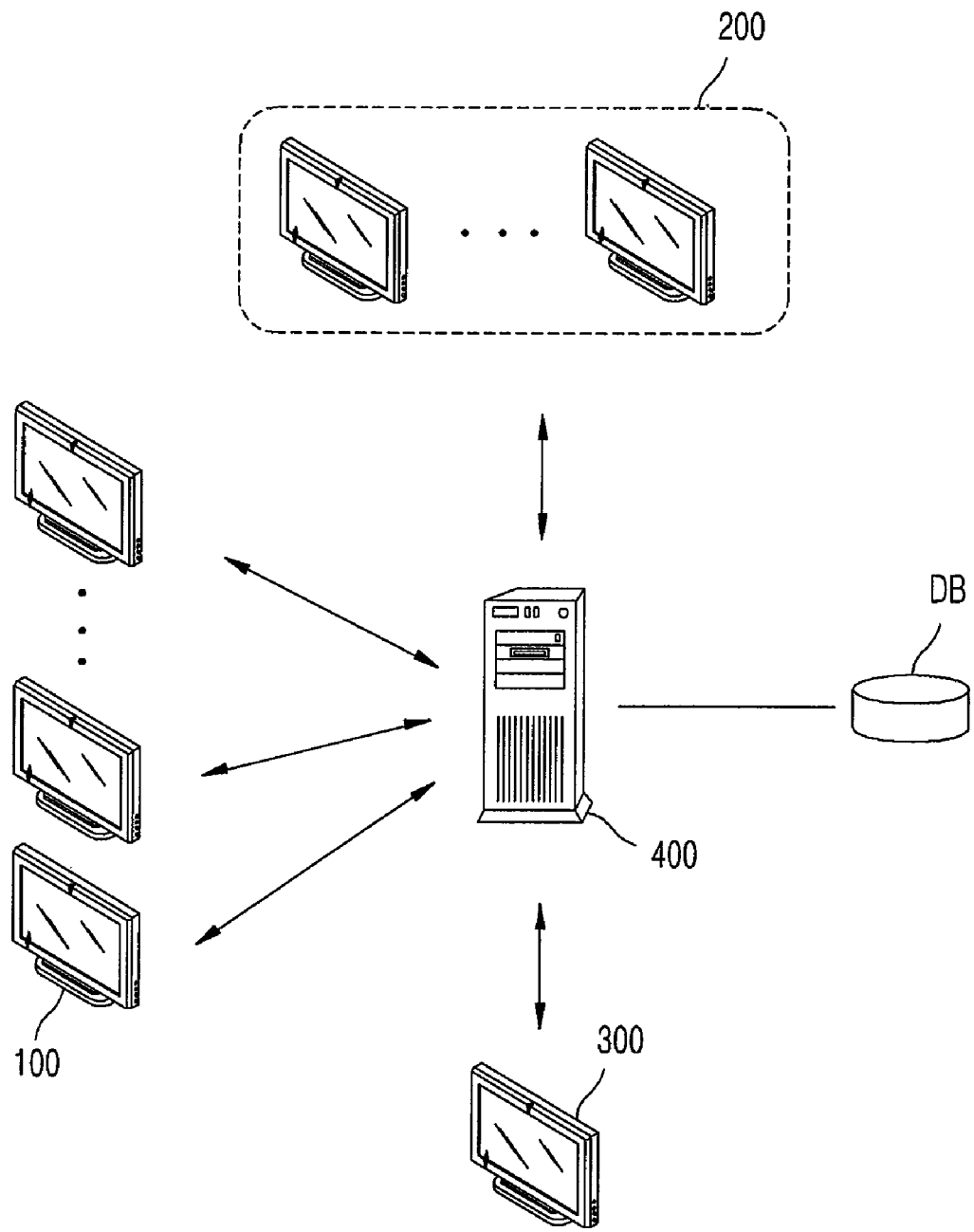
FIG. 2a is a block diagram showing the schematic configuration of a merchandise recommending system that derives recommended merchandise through a multiple image search according to a first embodiment of the present invention.
Figure 2B:
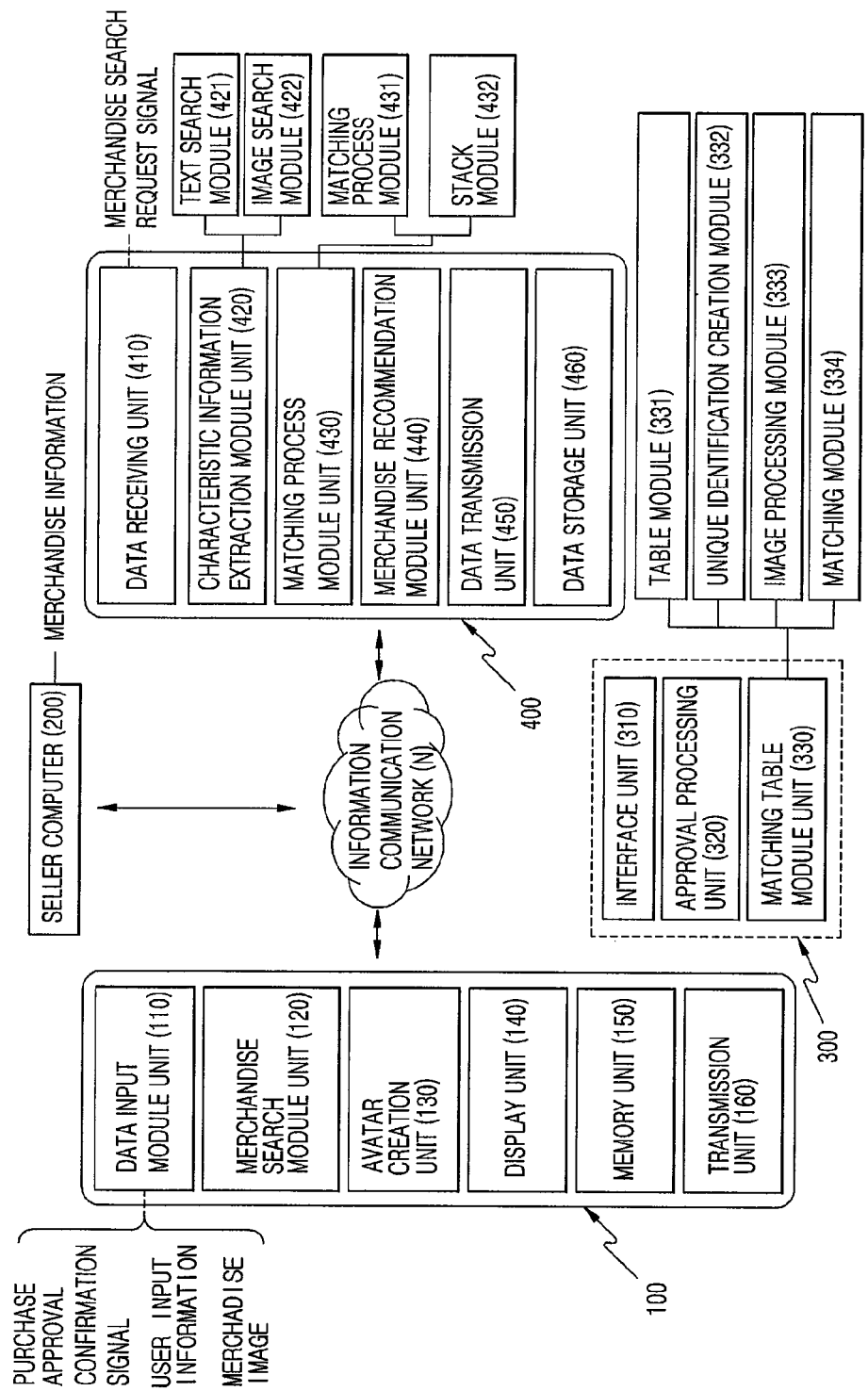
FIG. 2b is a view showing the configuration of the merchandise recommending system that derives recommended merchandise through a multiple image search according to a first embodiment of the present invention.
Figure 3:
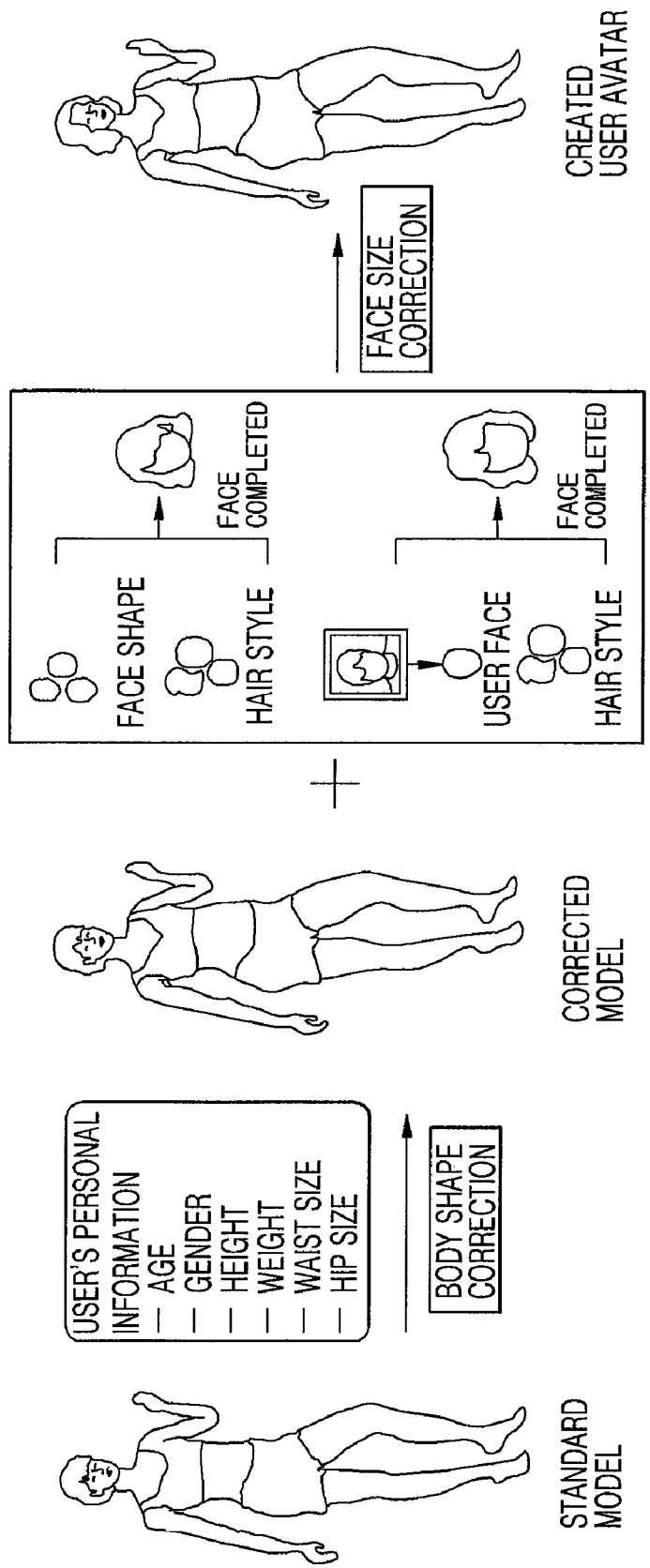
FIG. 3 is a view showing an avatar created based on user's basic information according to a first embodiment of the present invention.

FIG. 2a is a block diagram showing the schematic configuration of a merchandise recommending system that derives recommended merchandise through a multiple image search according to a first embodiment of the present invention, FIG. 2b is a view showing the configuration of the merchandise recommending system that derives recommended merchandise through a multiple image search according to a first embodiment of the present invention, and FIG. 3 is a view showing an avatar created based on user's basic information according to a first embodiment of the present invention.

As shown in FIG. 2a, the merchandise recommending system for deriving recommended merchandise through a multiple image search according to the present invention comprises a user computer 100, a seller computer 200, a manager computer 300, and an operator server 400. Respective functions thereof will be described below referring to FIG. 2b.

First, in the present embodiment, the user computer 100 includes a plurality of users or buyers who search for or purchase merchandise through the merchandise recommending system. The users can use the merchandise recommending system after joining membership. Generally known joining membership will not be described. Meanwhile, the use computer 100 also includes a plurality of sellers, and merchandise information of the sellers can be uploaded.

The user computer 100, as shown in FIG. 2, receives user input information including personal information data, search condition data, and upload data from a user, searches for merchandise through a text search or an image search, and displays an avatar view wearing a recommended merchandise image so that the user can confirm the merchandise. The user computer includes a data input module unit 110, a merchandise search module unit 120, an avatar creation unit 130, a display unit 140, a memory unit 150, and a transmission unit 160.

Specifically, the data input module unit 110 receives the user input information from the user, receives a 'purchase approval confirmation signal' for the user input information from the manager computer 300, and receives extracted or recommended merchandise images from the operator server 400.

In addition, the user input information includes personal information data, search condition data, and upload data. The personal information data contains user's private information, such as age, height, weight, chest size, waist size, hip size, gender, skin tone, body shape, and the like. The search condition data contains a use purpose, use place, use target, concept, and the like of merchandise. The upload data contains a color, pattern, silhouette, image, merchandise, and the like.

At this point, when the data input module unit 110 receives the user input information from the user, it is desirable to receive a 'merchandise search request signal' at the same time, since, as described above, the user inputs the personal information data, search condition data, and upload data in order to search for merchandise.

Here, since the silhouette, pattern, color, and the like included in the upload data can be made by the user and also can be ordered, manager's approval is separately needed to upload them. Specifically, a silhouette database (DB) is constructed with silhouette images and pattern data that represent a generic form of the merchandise. The silhouette images and the pattern data are manufactured by the manager or the user and registered in the database. When a silhouette is registered, a silhouette image is registered together with information such as gender, age, season, style, and the like. When a pattern is registered, a pattern image is registered together with information such as material, pattern features (horizontal lines, flower patterns, traditional symbols, English letters, and the like), overall main color, and the like. In addition, a merchandise DB registers basic information on merchandise that is actually transacted, such as a photograph, price, quantity, detailed descriptions, and the like, a corresponding silhouette image or a pattern image that are selected, and additional information such as gender, age, season, style, material, pattern features (horizontal lines, flower patterns, traditional symbols, English letters, and the like), overall main color, and the like. In the case of a website having detailed categories adaptive to the silhouette, pattern, color, and the like, the corresponding site is previously analyzed, and category information is registered in a category DB using the same code system as that of the codes registered in the silhouette DB. The method of previously analyzing the corresponding site and constructing the database is such that after collecting images and data of the corresponding site once a day or at specific time intervals through a TCP/IP socket connection, data contents are stored in a matching table that will be described below, and images are stored in corresponding folders. Meanwhile, in the case of registering merchandise information registered in other sites and the like, merchandise data is collected through the TCP/IP socket connection described above using the keyword meta tags of a merchandise page and is registered according to keyword classification.

The merchandise search module unit 120 searches for merchandise through a text search or an image search. Specifically, in order to perform a text search, a keyword first search is performed based on the user input information, and then categories containing the keywords are searched for. In order to perform an image search, merchandise images are searched for by selecting an image through the keywords or the categories.

Meanwhile, in the image search, images can be searched for using the images derived from the text search. That is, keywords and categories can be searched for from image characteristic information according to the derived search result. At this point, if a plurality of images is derived, a plurality of optimal images can be derived using the number of keywords and the uppermost layer.

The avatar creation unit 130 creates a user adaptive avatar image that represents a user based on personal information data including user's gender, age, height, weight, chest size, waist size, hip size, and the like.

In other words, as shown in FIG. 3, the avatar creation unit 130 creates a user adaptive body avatar by selecting or inputting user's age, height, weight, chest size, waist size, hip size, gender, body shape, and the like, and completes a user's own avatar by selecting a face shape, hair style, skin tone, and the like or by uploading a user's own face picture.

The display unit 140 displays the created avatar wearing a merchandise image recommended through the merchandise search so that the user can confirm the recommended merchandise image, which also can be confirmed through a separate output apparatus. That is, since the avatar similarly represents the user's face and body shape, the user can determine whether the recommended merchandise is suitable by viewing the avatar wearing the merchandise image.

The memory unit 150 stores the created avatar and the user input information received from the user.

The transmission unit 160 receives a request for a text search or an image search from the user and transmits a 'merchandise search request signal' and the user input information.

That is, the transmission unit transmits the 'merchandise search request signal' to the operator server 400 and the user input information to the manager computer 300.

Next, the seller computer 200 receives merchandise information from sellers so that a plurality of sellers can sell merchandise, transmits a 'sale request signal' according thereto and the merchandise information to the manager computer 300, and receives a 'sale approval confirmation signal' from the manager computer 300 according to the registration of the merchandise information.

At this point, a separate merchandise registration tool is used to register merchandise by selecting merchandise information defined in the tool, and the merchandise information includes gender, age, season, style, material, pattern information, and other detailed information.

Specifically, the other detailed information contains information related to a woman, such as accessories, pants, blouses, overcoats, bags, cardigans, jackets, vests, jumpers, knits, caps, shoes, shirts, skirts, socks, and the like, or contains information related to a man, such as accessories, pants, overcoats, bags, cardigans, jackets, vests, jumpers, knits, caps, shoes, shirts, socks, and the like.

Meanwhile, when a silhouette is registered, a silhouette image is registered together with information such as gender, age, season, style, and the like. When a pattern is registered, a pattern image is registered together with information such as material, pattern features (horizontal lines, flower patterns, Taegeuk symbols, English letters, and the like), overall main color, and the like. When merchandise is registered, basic information on the merchandise, such as a photograph, price, quantity, detailed descriptions, and the like, is registered, and a silhouette image and a pattern image suitable for the merchandise are selected, which are previously registered in the operator server 400, and information, such as gender, age, season, style, material, pattern, color, categories, and the like, is additionally registered.

Next, the manager computer 300 approves the user input information and the merchandise information inputted through the user computer 100 and the seller computer 200, creates a unique identification number for each of the information, and constructs a matching table so that the user input information and the merchandise information are matched to each other. The manager computer includes an interface unit 310, an approval processing unit 320 for determining whether to approve the user input information and the merchandise information, and a matching table module unit 330.

First, the interface unit 310 receives the user input information and the merchandise information inputted through the user computer 100 and the seller computer 200, transmits a 'purchase approval confirmation signal' for the user input information and a 'sale approval confirmation signal' for the merchandise information to the user computer 100 and the seller computer 200, and transmits the created unique identification number of each of the user input information and the merchandise information together with a matching table according thereto to the operator server 400.

The matching table module unit 330 creates a unique identification number for each data contained in the user input information and the merchandise information, and constructs a matching table so that merchandise is smoothly searched for. The matching table module unit contains a table module 331 for containing category information, season, color, pattern, gender, usage, material, and the like, a unique identification number creation module 332 for creating a distinguishable unique identification number for each data corresponding to the user input information and the merchandise information, an image processing module 333 for inserting image characteristic information into the matching table using the image information contained in the user input information and the merchandise information, and a matching module 334 for matching the table module 331 and the unique identification number to each other.

The information registered in the table module 331 will be described in detail below. When a silhouette is registered, a silhouette image is registered together with information such as gender, age, season, style, and the like. When a pattern is registered, a pattern image is registered together with information such as material, pattern features (horizontal lines, flower patterns, Taegeuk symbols, English letters, and the like), overall main color, and the like. When merchandise is registered, basic information on the merchandise, such as a photograph, price, quantity, detailed descriptions, and the like, is registered, and a silhouette image and a pattern image suitable for the merchandise are selected, which are previously registered in the operator server 400, and information such as gender, age, season, style, material, pattern, color, categories, and the like, is additionally registered. Accordingly, as the user constructs an image by selecting a silhouette, pattern, and color, merchandise adaptable thereto is recommended. That is, in the case of a site having detailed categories adaptive to the silhouette, pattern, color, and the like, the categories of the corresponding site are analyzed and constructed as a database in advance, and images under the categories that are matched to an image handled by the user are automatically recommended.

The image processing module 333 inserts characteristic information through an encoder and analyzes the characteristic information using a decoder.

That is, the image processing module includes an encoder (not shown) for inserting characteristic information and a decoder (not shown) for analyzing characteristic information. For reference, the techniques for inserting characteristic information include watermarking, image header information processing, a distribution method and a layer method of data file, and the like.

Meanwhile, the operator server 400 receives a 'merchandise search request signal' from the user computer 100 and derives merchandise images according to the image information resulting from a text search or an image search. The operator server includes a data receiving unit 410, a characteristic information extraction module unit 420, a matching process module unit 430, a merchandise recommendation module unit 440, a data transmission unit 450, and a data storage unit 460.

The data receiving unit 410 receives a 'merchandise search request signal' containing a text search or an image search (request) from the user computer 100, and receives a unique identification number of each user input information and merchandise information together with a corresponding matching table from the manager computer 300.

The characteristic information extraction module unit 420 performs a text search or an image search in response to the 'merchandise search request signal' and extracts image characteristic information. The characteristic information extraction module unit contains a text search module 421 for performing a keyword first search based on the user input information, and extracting image characteristic information by searching for text word information according to text input from a table corresponding to a defined command, and an image search module 422 for extracting, in the case of an image search, image characteristic information from the matching table containing image information and unique identification numbers.

In addition, the image search module 422 can search for images using an image derived by a text search, i.e., the image search module can search for keywords and categories from the image characteristic information according to the derived search result.

At this point, if a plurality of images is derived, a plurality of optimal images is derived by comparing the images through a layer method.

Next, the matching process module unit 430 sequentially arranges images by performing a command processing on search keywords that are searched through the characteristic information extraction module unit 420. The matching process module unit contains a matching process module 431 for searching for a unique identification number according to search information, re-searching for the keywords inputted by the user within the search result, and processing a command corresponding to the keywords, and a stack module 432 for sequentially arranging from the best searched image using the characteristic information and the layer value of an image.

For reference, the stack has a parallel and serial structure containing image characteristic information, keywords, and image layer values. That is, basically, images in a category are initially stored in the stack according to the number of (matched) search keywords possessed by each image. The purpose is to collectively process and to orderly show the searched images through the stack, not to randomly show the searched images for the purpose of fast searching. Therefore, the images searched within the category according to the keywords are initially stored by way of the stack. Within the stack, using the stored characteristic information and the layer value of each image, the best searched image is stored at the front portion of the search area in the stack, and an image that has the same layer value but fewer image characteristic information corresponding to the keywords is positioned at the rear portion of the stack area, thereby sequentially arranging the images. The stack of the sequentially arranged images is transmitted to the search system and thus the arranged images are collectively transferred to the user. At this point, the priority is determined in order of the number of keywords, the uppermost layer, and image characteristic information, but the present invention is not limited to this.

The merchandise recommendation module unit 440 derives recommended merchandise using image characteristic information according to the search result.

In other words, information on the registered merchandise is compared and detected in connection with selected image information. Merchandise is searched according to precision and similarity, and merchandise is derived in order of higher precision and similarity.

The data transmission unit 450 transmits the merchandise extracted through the merchandise recommendation module unit 440 to the user computer 100.

The data storage unit 460 stores the user input information, merchandise information, unique identification numbers, and matching table.

Hereinafter, referring to FIGS. 4 to 14, described is a merchandise recommending method for deriving recommended merchandise through a multiple image search in a system configured as shown in FIG. 2 according to a first embodiment of the present invention described above.

Figure 4:
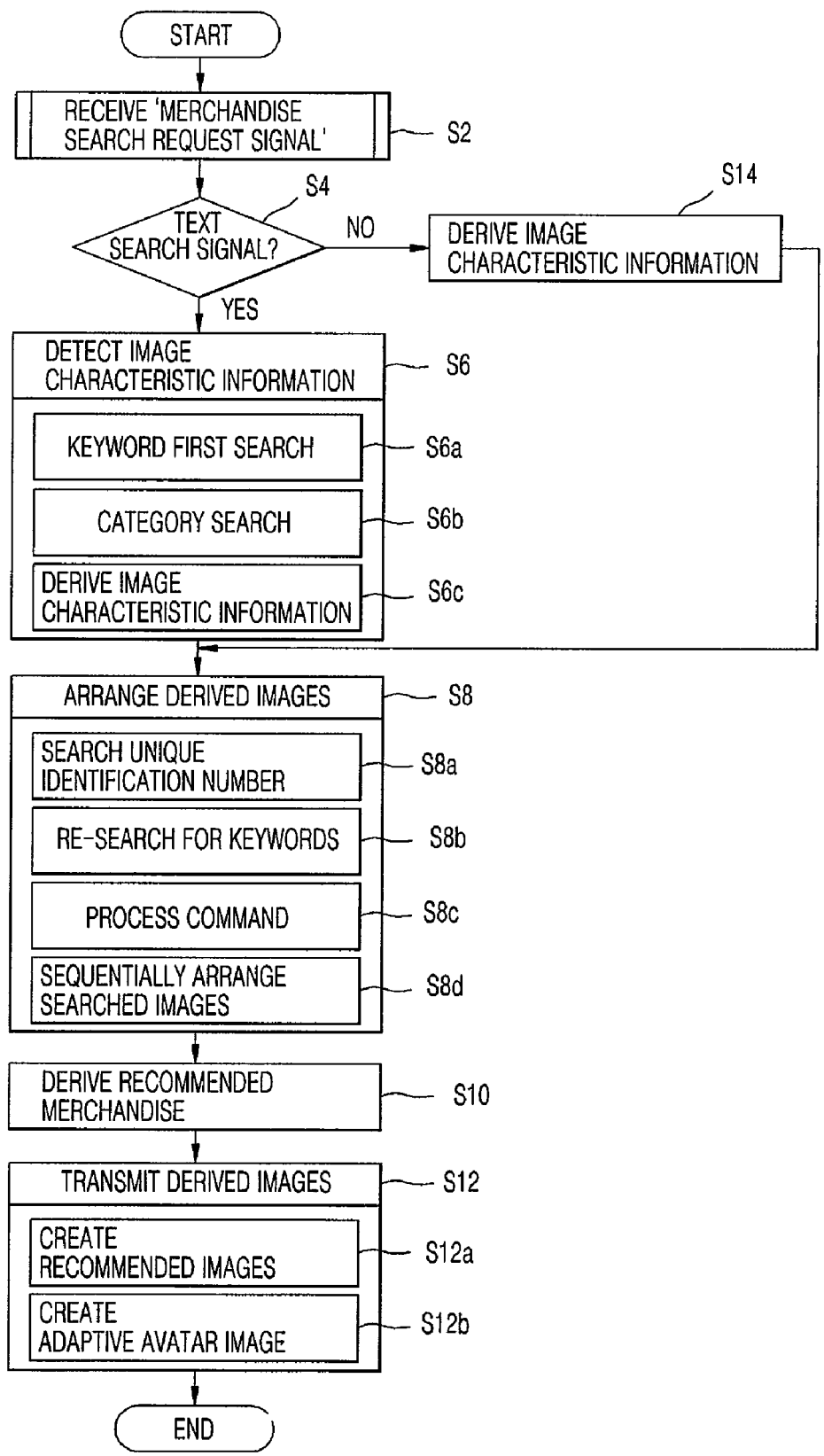
FIG. 4 is a flowchart generically illustrating a merchandise recommending method for deriving recommended merchandise through a multiple image search according to a first embodiment of the present invention.
Figure 5:
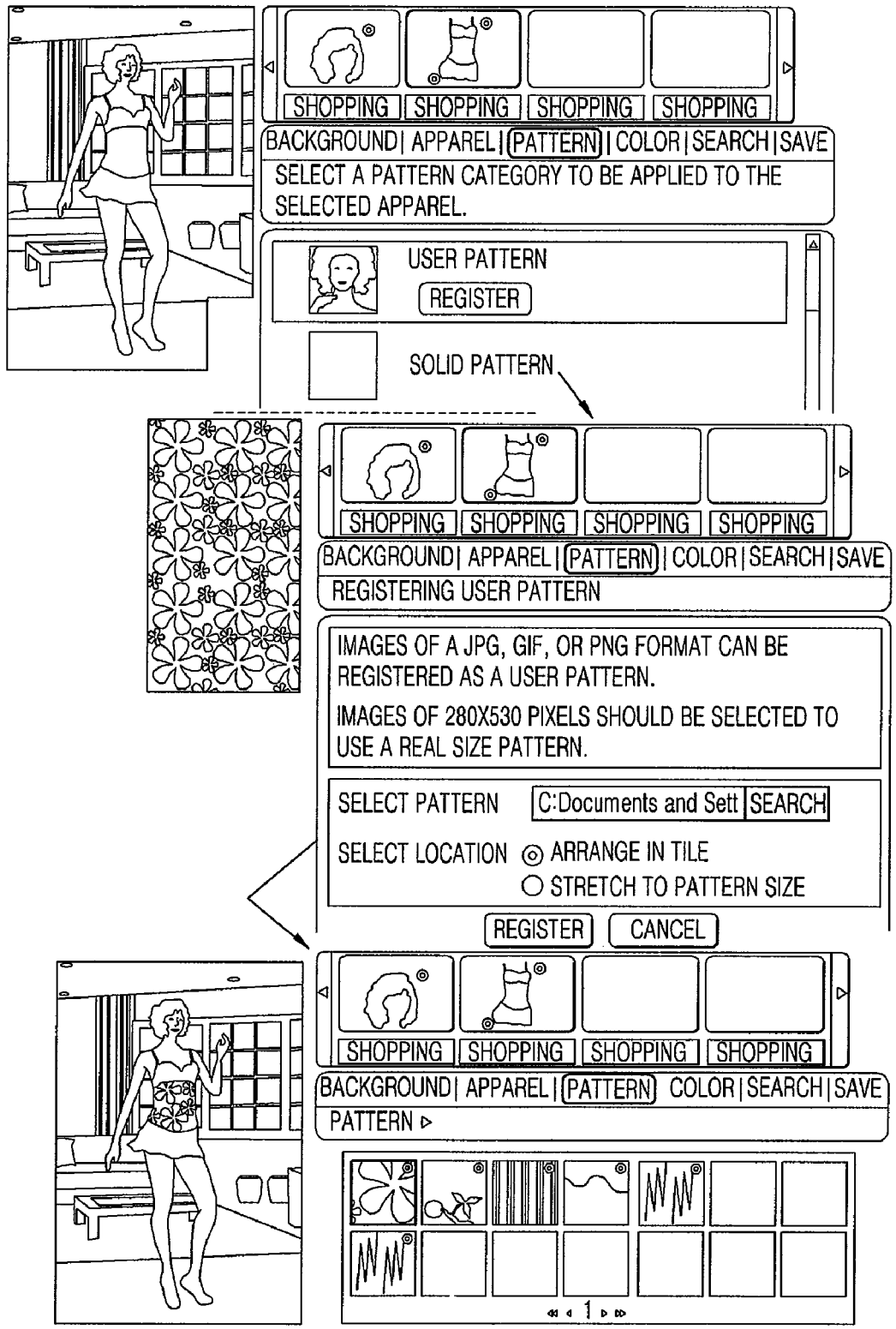
FIG. 5 is a view showing a screen uploading a pattern according to a first embodiment of the present invention.
Figure 6:
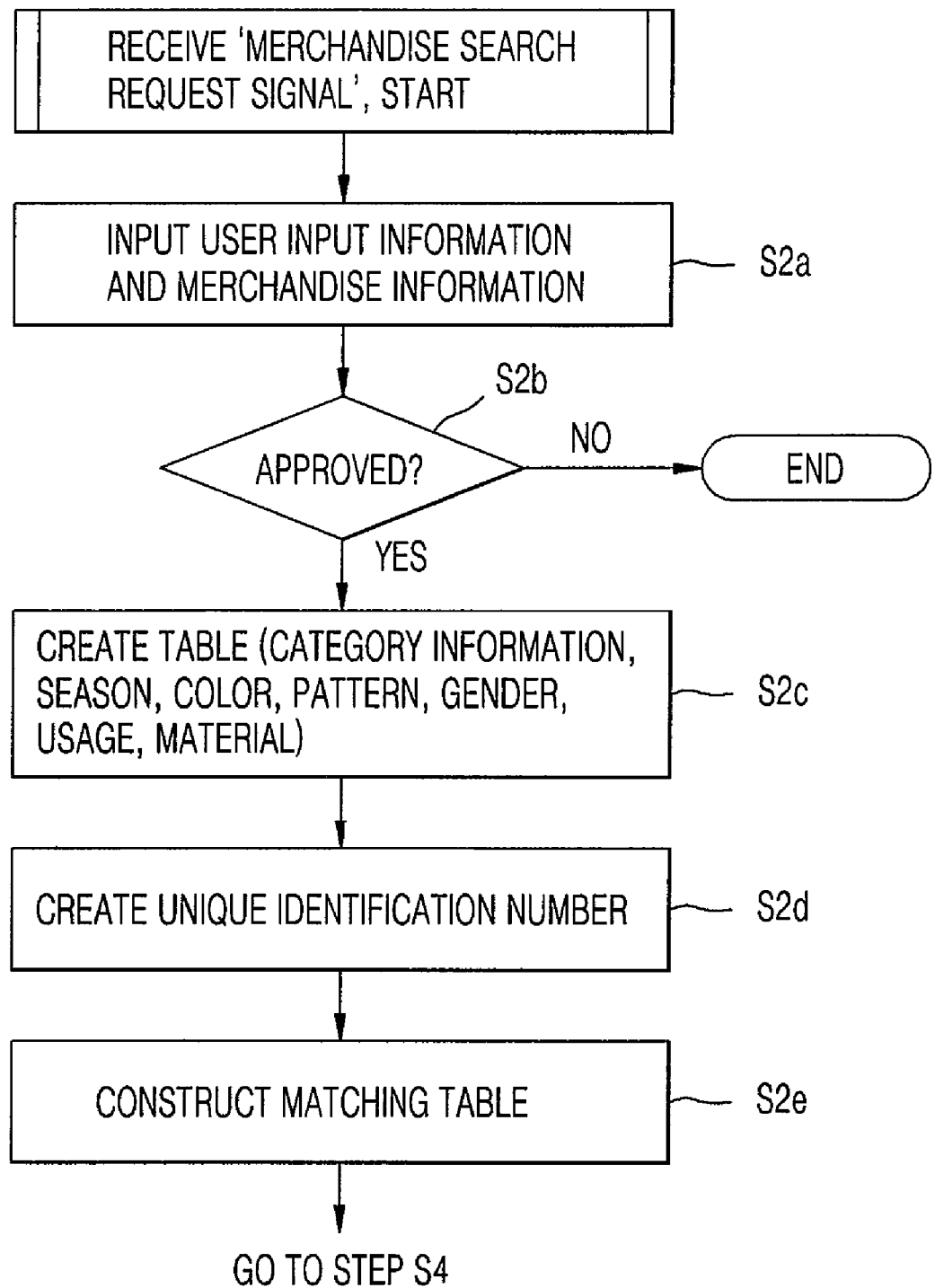
FIG. 6 is a flowchart illustrating in detail the step of receiving a 'merchandise search request signal' according to a first embodiment of the present invention.
Figure 7B:
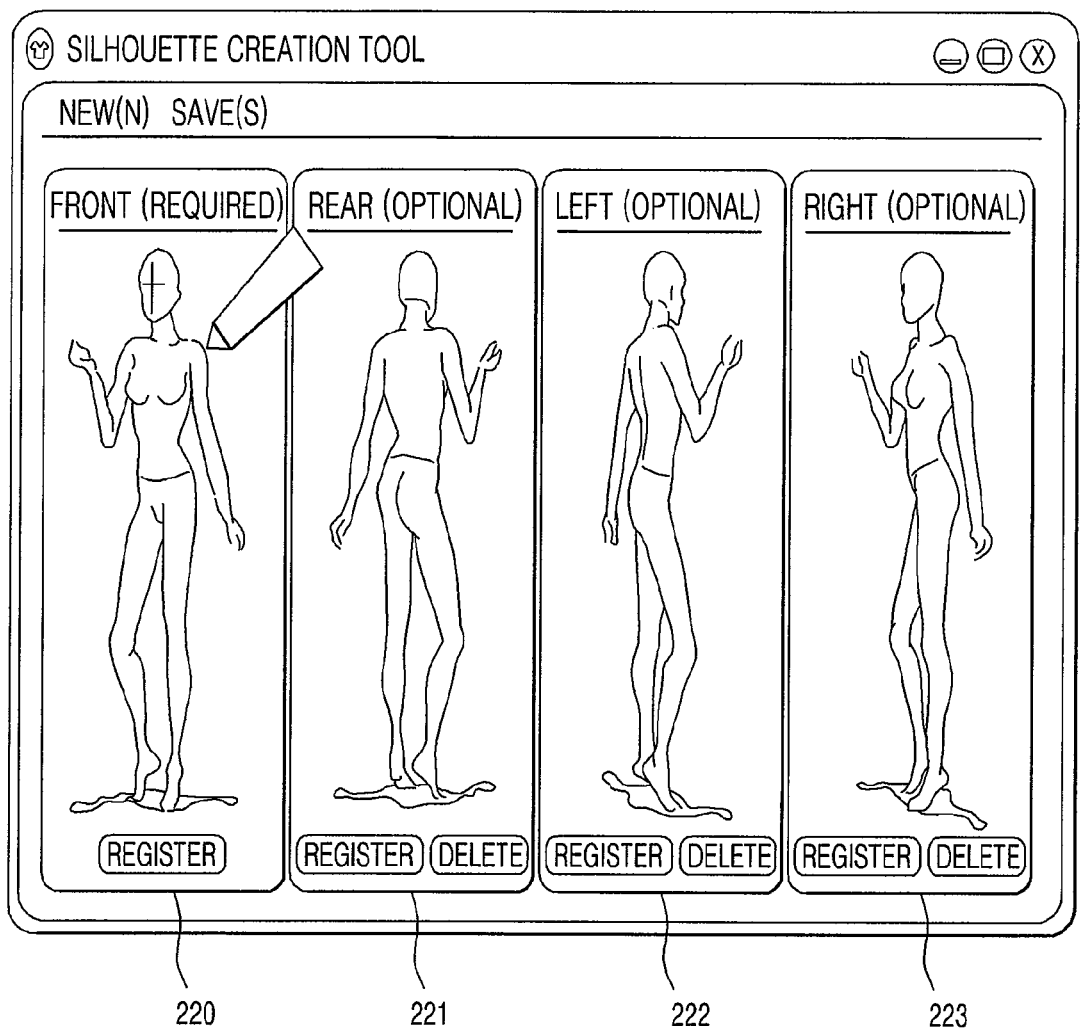
FIG. 7b is a view showing a silhouette creation tool according to a first embodiment of the present invention.
Figure 8:
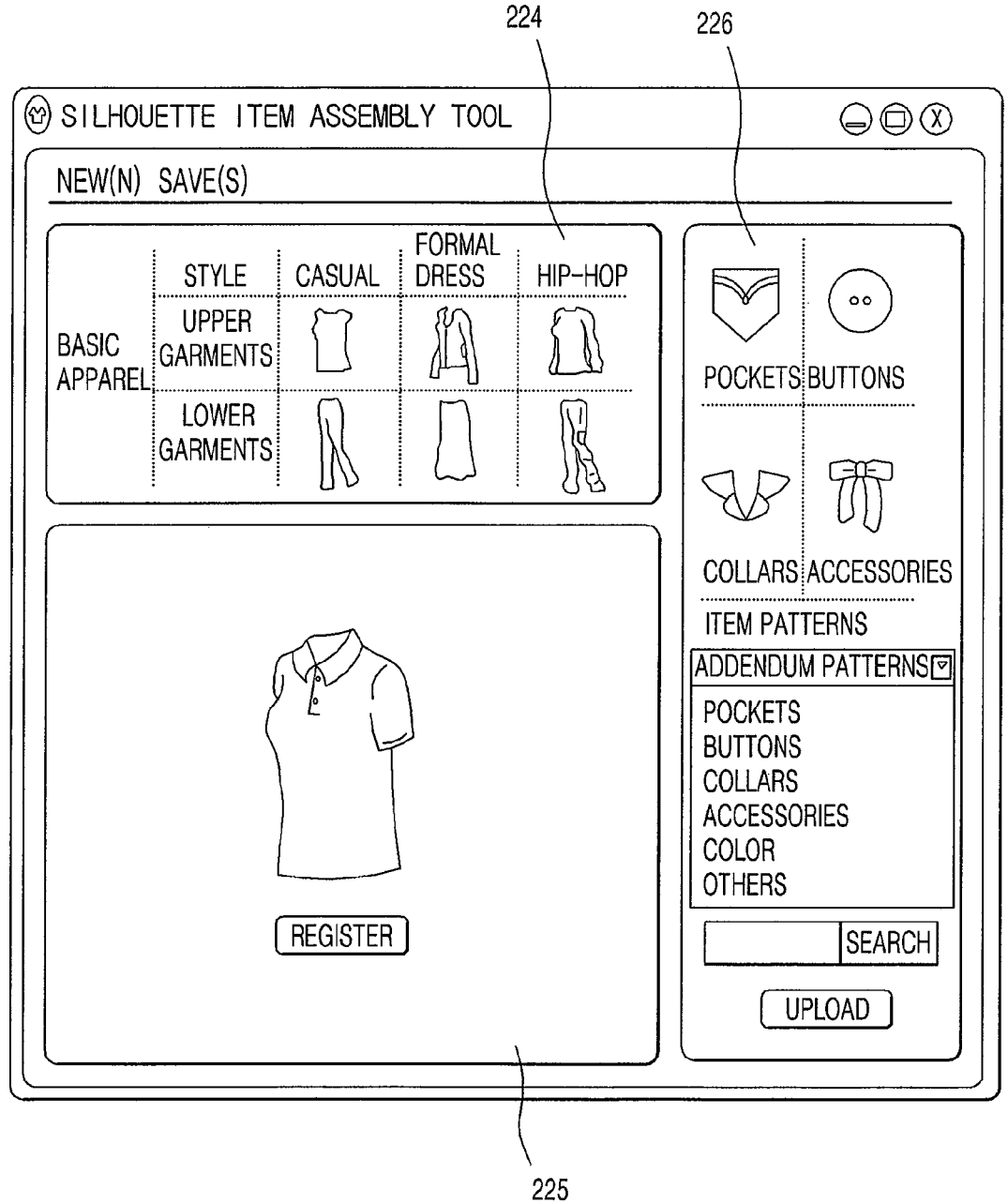
FIG. 8 is a view showing a silhouette item assembly tool according to a first embodiment of the present invention.
Figure 11:
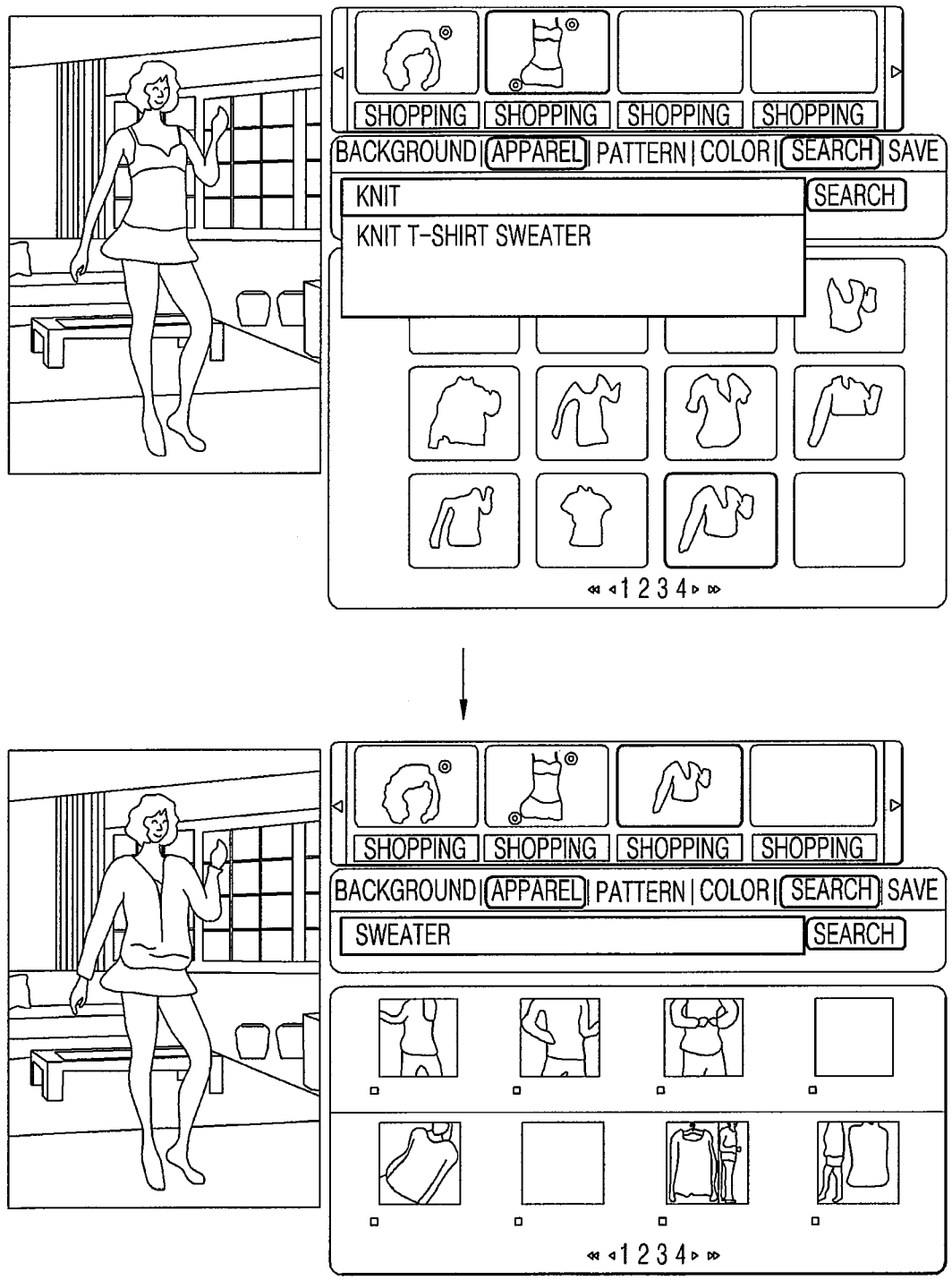
FIG. 11 is a view showing a screen of deriving merchandise using a text search according to a first embodiment of the present invention.
Figure 12:
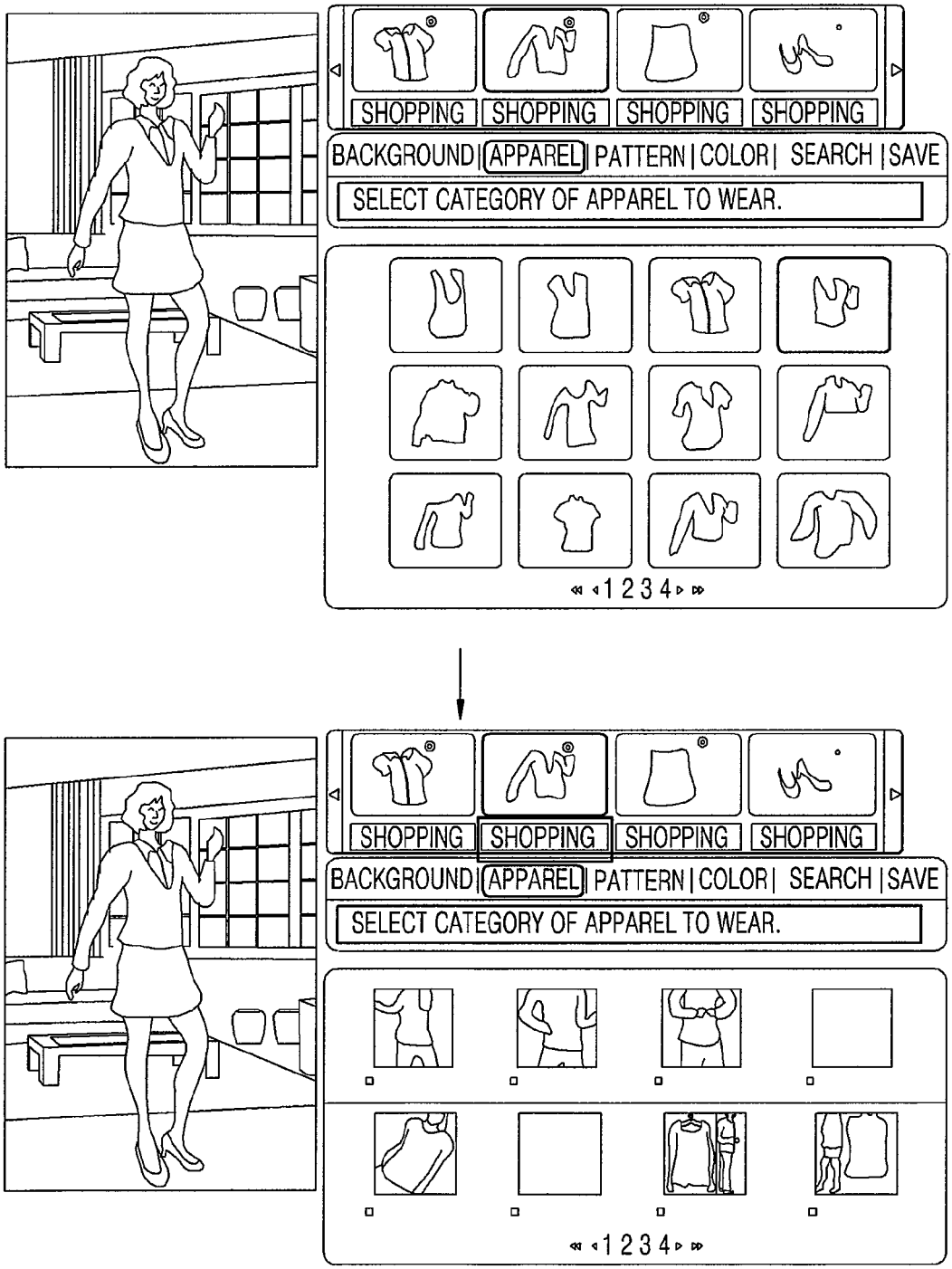
FIG. 12 is a view showing a screen of deriving recommended merchandise according to a first embodiment of the present invention.
Figure 13:
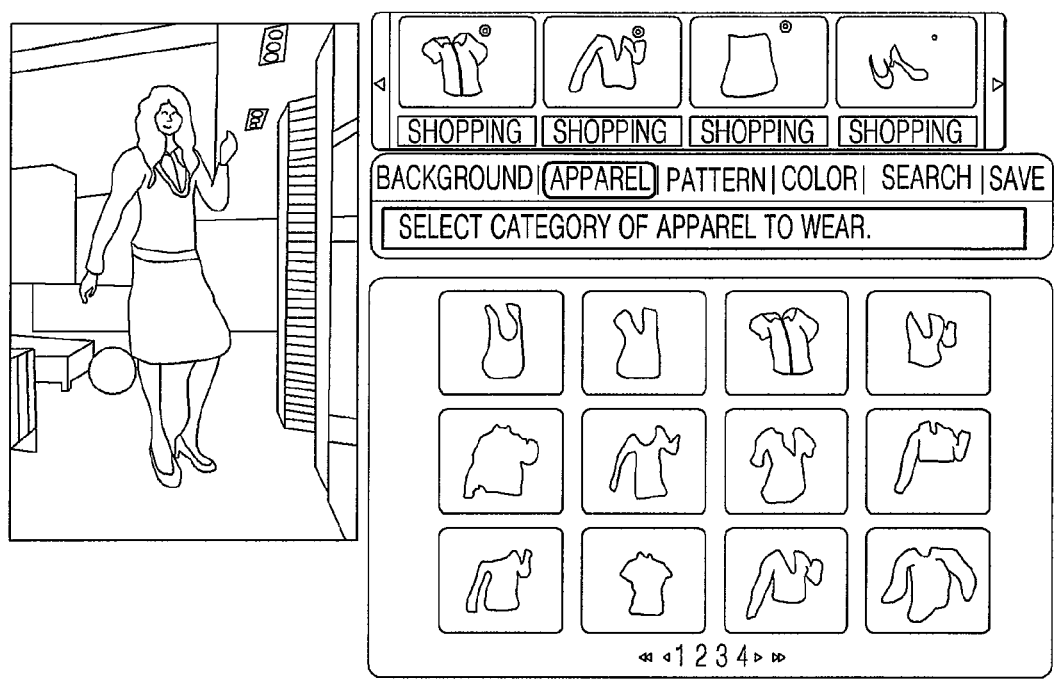
FIG. 13 is a view showing an avatar wearing recommended merchandise according to a first embodiment of the present invention.
Figure 14:
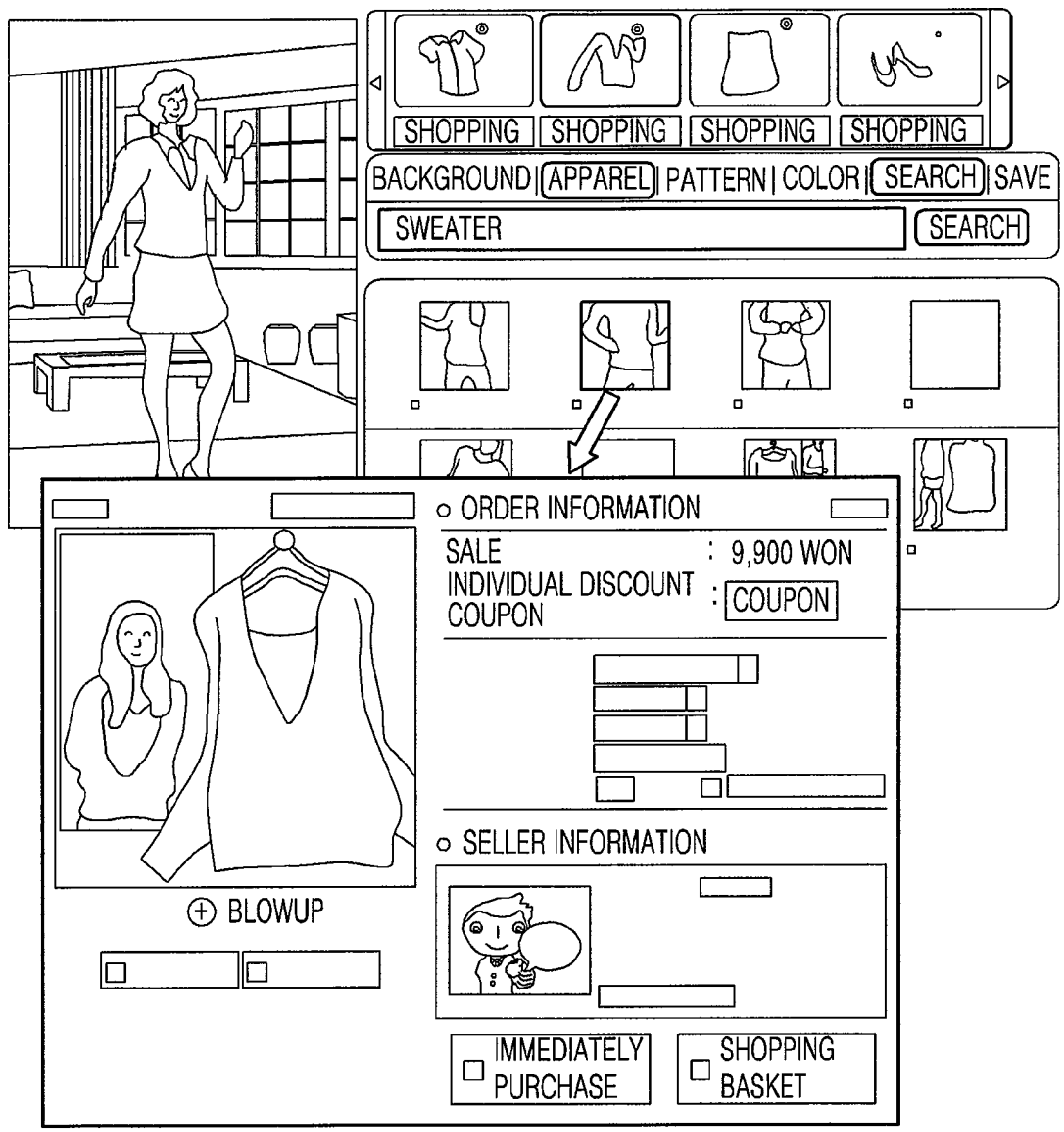
FIG. 14 is a view showing a screen of deriving merchandise using an image search according to a first embodiment of the present invention.

FIG. 4 is a flowchart generically illustrating a merchandise recommending method for deriving recommended merchandise through a multiple image search according to a first embodiment of the present invention; FIG. 5 is a view showing a screen uploading a pattern according to a first embodiment of the present invention; FIG. 6 is a flowchart illustrating in detail the step of receiving a 'merchandise search request signal' according to a first embodiment of the present invention; FIG. 7*a* is a view showing a silhouette image registration tool according to a first embodiment of the present invention; FIG. 7*b* is a view showing a silhouette creation tool according to a first embodiment of the present invention; FIG. 8 is a view showing a silhouette item assembly tool according to a first embodiment of the present invention; FIG. 9 is a view showing a pattern image registration tool according to a first embodiment of the present invention; FIG. 10 is a view showing a merchandise registration tool according to a first embodiment of the present invention; FIG. 11 is a view showing a screen of deriving merchandise using a text search according to a first embodiment of the present invention; FIG. 12 is a view showing a screen of deriving recommended merchandise according to a first embodiment of the present invention; FIG. 13 is a view showing an avatar wearing recommended merchandise according to a first embodiment of the present invention; FIG. 14 is a view showing a screen of deriving merchandise using an image search according to a first embodiment of the present invention.

First, as shown in FIG. 4, the operator server 400 receives a 'merchandise search request signal' from the user computer 100 S2.

Describing in detail the step S2 of receiving the 'merchandise search request signal', the user computer 100 receives user input information including personal information data, search condition data, and upload data from a user and transmits the user input information to the manager computer 300.

For reference, in the step of uploading pattern data to the operator server 400 by the user after acquiring manager's approval, as shown in FIG. 5, if the user registers a pattern, the pattern is displayed in the pattern list as an element 'user pattern', and thus the user can select the pattern. The user can also select the position of the pattern as well as the pattern itself.

Here, since the silhouette, pattern, color, and the like included in the upload data can be made by the user and also can be ordered, manager's approval is separately needed to upload them.

Meanwhile, in order to sell merchandise, the seller computer 200 transmits a 'sale request signal' according thereto and merchandise information to the manager computer 300.

That is, the manager computer 300, as shown in FIG. 6, receives the user input information and the merchandise information S2a.

The manager computer 300 determines whether to approve the received user input information and merchandise information S2b, creates a table containing category information, season, color, pattern, gender, usage, material, and the like S2c, creates a distinguishable unique identification number for each data corresponding to the user input information and the merchandise information S2d, and constructs a matching table for matching the table and the unique identification number to each other S2e.

Describing in detail the step S2e of constructing the matching table, first, in order to construct a silhouette and pattern database and a merchandise database, performed is the process of registering a silhouette image registration tool, a silhouette creation tool, a silhouette item assembly tool, a pattern image registration tool, and a merchandise registration tool.

As shown in FIG. 7*a*, the silhouette image registration tool contains a silhouette image registration window 202, a category window 204 for showing the categories of a corresponding silhouette image, and a registration information selection window 206.

At this point, the registration information preferably includes gender, age, season, style, or the like. Accordingly, a user who desires to register a silhouette image inputs a silhouette image and its characteristic information using the tool and registers the silhouette image.

The process of registration is such that a silhouette image is manufactured, the manufactured silhouette image is uploaded through the silhouette image registration window 202, silhouette characteristic information is selected through the registration information selection window 206, and the registration button is pressed to complete the registration. On the other hand, as shown in FIG. 7*b*, the silhouette creation tool can create not only the front side 220, but also the rear side 221, left side 222, and right side 223 of the silhouette.

In addition, the silhouette item assembly tool shown in FIG. 8 contains a basic apparel selection window 224, a selected apparel display window 225, a detail selection window 226, and a detail classification selection window 227.

In addition, the pattern image registration tool shown in FIG. 9 contains a pattern registration window 208, a pattern type and size selection window 210, and a gender and age selection window 212. Accordingly, a user who desires to register a pattern image selects a pattern image desired to register and its characteristic information using the tool and registers the pattern image.

As shown in FIG. 10, the merchandise registration tool contains a merchandise image registration window 214, a characteristic information selection window 216, and a gender and age selection window 218. Accordingly, a user who desires to register merchandise registers the merchandise together with information on the merchandise, such as merchandise image, price, quantity, silhouette, categories, material, pattern, color, gender, age, season, style, and the like, using the tool. That is, a merchandise image is obtained by photographing the merchandise, the photograph of the merchandise is registered through the merchandise image registration window 214 using the merchandise registration tool, characteristic information of the merchandise is selected through the characteristic information selection window 216 and the gender and age selection window 218, and detailed information is inputted to complete the registration.

That is, as described above, the merchandise DB registers basic information on merchandise that is actually transacted, such as a photograph, price, quantity, detailed descriptions, and the like, a corresponding silhouette image and a pattern image that are selected, and additional information such as gender, age, season, style, material, pattern features (horizontal lines, flower patterns, traditional symbols, English letters, and the like), overall main color, and the like.

If the approval is confirmed, the manager computer 300 that has received the user input information from the user computer transmits a 'purchase approval confirmation signal' to the user computer 100 and a 'sale approval confirmation signal' to the seller computer 200, and transmits the created unique identification number and matching table to the operator server 400.

Next, the operator server 400 determines whether the received 'merchandise search request signal' is a text search signal or an image search signal S4.

If a text search signal is received in step S4, the operator server 400, as shown in FIG. 11, detects image characteristic information through a text search S6.

Describing in detail the step S6 of performing a text search, the operator server 400 performs a keyword first search based on the user input information S6a, searches for categories containing the keywords S6b, and derives image characteristic information from an image containing the keywords or an image within the categories S6c.

That is, if a user selects a detailed image from the searched images, a group of images is detected by searching for the keywords and categories through an image search based on the characteristic information of the detailed image, and image characteristic information is derived from the detected images, and thus merchandise can be recommended using the matching table.

For example, if images are searched by inputting a text 'mountain climbing', the result will be shown as followings.

Mountain climbing—hiking gears—(upper hiking gear, hiking gear pants, caps, socks, shoes, and others)
camp—(camping lamps, alpenstocks, tents, equipment, and others)
backpack—(portable bags, snack sacks, and others)

As described above, all the images corresponding to the categories that are included in mountain climbing are searched.

That is, if images are searched using the keyword 'mountain climbing', representative images 'hiking gear', 'camp', and 'backpack' are searched for, and subsequently, representative images corresponding to images under each of the categories 'hiking gear', 'camp', and 'backpack' are searched for.

Next, the operator server 400 sequentially arranges all the derived images using the extracted image characteristic information S8.

Specifically, the operator server 400 searches for a unique identification number according to the user input information in order to derive images S8a, re-searches for the keywords inputted by the user within the search result S8b, processes a command corresponding to the keywords S8c, and sequentially arranges from the best searched image using the characteristic information and the layer value of the images S8d.

In other words, characteristic information of each image group is detected from each of the searched representative images. Using the detected conditions, together with the search conditions of the keywords and the categories based on the keywords inputted by the user, the keywords and the categories of the characteristic information and similar images within the image group are arranged through the stack.

The operator server 400, as shown in FIG. 12, derives recommended merchandise using the image characteristic information according to the search result S10.

In step S10, characteristic information of the images arranged in step S8 is transmitted to the matching table according to the priority. In the matching table, performed is matching to the merchandise registered in the operator server 400 or to merchandise groups registered by E-Marketplaces or shopping malls based on the transmitted characteristic information of the image groups, and similar merchandise is recommended.

Next, the operator server 400 transmits the derived similar merchandise to the user computer 100 so that the user can confirm the merchandise S12.

Describing step S12 in detail, the user computer 100 creates a user adaptive avatar image that represents a user using personal information data including user's gender, age, height, weight, chest size, waist size, hip size, and the like S12a. The user computer receives the derived merchandise from the operator server 40, dresses the avatar in the merchandise, and displays the avatar as shown in FIG. 13 S12b.

At this point, detail items, a pattern, a color, or the like are combined with the avatar using the characteristic information of the selected detailed image in order to show a form of coordination (i.e., decoration) exercised on the user avatar, and according thereto, characteristic information of the image is transmitted so that similar merchandise is recommend through the matching table.

On the other hand, if an image search signal is received in step S4, the operator server 400, as shown in FIG. 14, searches for image characteristic information through an image search S14.

For example, if 'hiking gear' that is a representative image of 'mountain climbing' is selected for searching, the result will be shown as followings Mountain climbing—hiking gears—upper hiking gears
        hiking gear pants
        caps
        socks
        shoes That is, images contained in the table 'hiking gears', and the upper category of the 'hiking gear', i.e., 'climbing mountain' category, are searched for, and similar image groups within the category can be searched for based on the characteristic information of silhouette 'hiking gears' through a keyword search within the category.

At this point, in the image search, images can be searched for using an image derived by a text search. That is, keywords and categories can be searched for from the image characteristic information according to the derived search result. At this point, if a plurality of images is derived, a plurality of optimal images can be derived using the number of keywords and the uppermost layer.

Figure 15:
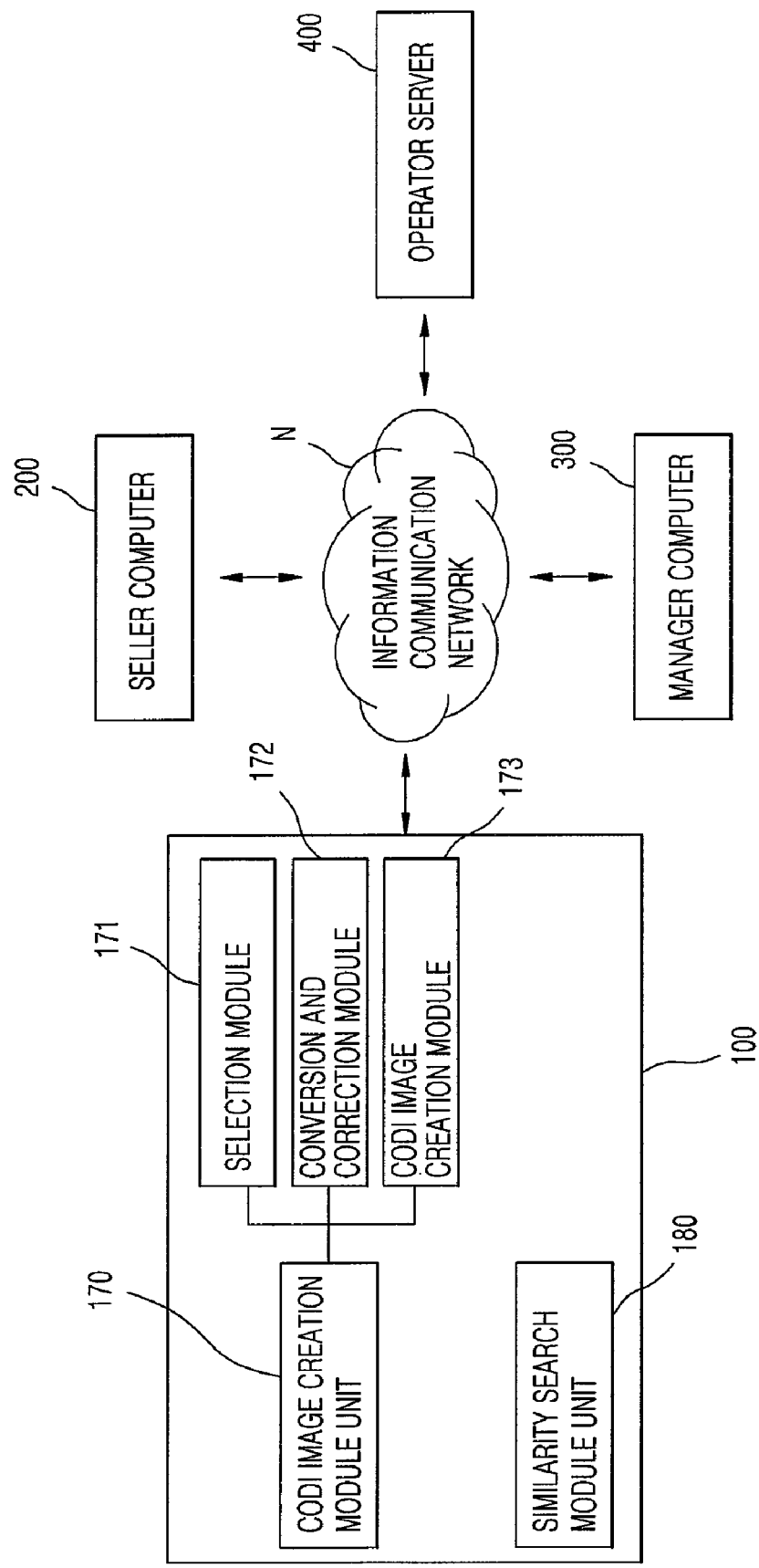
FIG. 15 is a view showing the schematic configuration of a system that preferentially recommends the merchandise whose silhouette, pattern, and color are matched according to a second embodiment of the present invention.

Hereinafter, referring to FIG. 15, a second embodiment of the present invention will be described. The second embodiment by and large takes a form similar to the system and method of the first embodiment. Accordingly, it will be described focusing on the differences from the first embodiment. FIG. 15 is a view showing the schematic configuration of a system that preferentially recommends the merchandise whose silhouette, pattern, and color are matched according to a second embodiment of the present invention.

First, as shown in FIG. 15, the user computer 100 of the second embodiment further comprises a codi image creation module unit 170 for creating a codi image suitable for the user's taste, inclination, and body shape by selecting a silhouette, pattern, color, and the like, and a similarity search module unit 180 for comparing and analyzing the derived image characteristic information and the registered merchandise information, and transmitting merchandise in order of the best matched merchandise.

Here, the codi is preferably used as the abbreviation of coordination.

The codi image creation module unit 170 contains a selection module 171 for selecting a registered silhouette, pattern, and color, a conversion and correction module 172 for correcting the silhouette, pattern, and color selected by the selection module 171, and a codi image creation module 173 for creating a codi image suitable for the user's taste, inclination, and body shape using the corrected silhouette, pattern, or color.

Specifically, the conversion and correction module 172 converts the pattern, color, size, drapes, rotation, or the like of an image in a variety of ways through pattern mapping, color correction, size conversion, rotation conversion, draping (an expression of pleats), or the like using a 2.9 D image convert engine that utilizes a 3-dimensionalized 2-dimensional (2D) image (referred to as 2.9D in the present invention). At this point, the driving speed and the capacity of an image are the same as those of 2D. In the case of using existing 2D images or photograph images, the pattern mapping, color correction, size conversion, and the like cannot be performed inherently, and thus the pattern, color, and the like are converted using a plurality of images in a DB.

For reference, the 2.9D image convert engine improves a 2D image into a 2.9D image that has a virtual z value for implementing a function of a 3D model. Through the created 2.9D image, the 2.9D image convert engine can apply pattern mapping, color correction, size conversion, rotation conversion, or the like. In the case of existing 3D models, in order to perform pattern mapping, color correction, size conversion, or the like, sources such as a plane surface based mapping model of a 3D form, 3D model, coordinate data, and the like are need. Therefore, it takes much time to perform the mapping, and file sizes are too large, so that the 2.9D image convert engine is inadequate to be used on the web. However, the improved mapping algorithm of the present invention can perform mapping only with 2.9D image data, and thus it is advantageous in that the pattern mapping, color correction, size conversion, or the like can be performed further faster than in a 3D model. Further, since the improved mapping algorithm has features of the same low capacity and high speed as those of 2D images, it can be easily applied to the web. Furthermore, since a 2.9D image has a virtual z value in itself, rotation conversion can be performed, and pattern mapping, color correction, size conversion, draping, or the like can be performed while performing rotation conversion. At this point, those operations are performed faster than the mapping of a 3D model that is performed while rotating.

That is, the conversion and correction module 172 performs pattern conversion, color conversion, size conversion, rotation conversion, and draping function using 2.9D images of itself, not 3D images, in a different manner from that of an existing 3D-based codi solution.

On the other hand, the similarity search module unit 180 recommends the merchandise all of whose silhouette, pattern, and color are matched to the image characteristic information in the first place, the merchandise whose silhouette and pattern are matched in the next place, and the merchandise whose silhouette is matched in the next place.

Describing in detail the similarity search module unit 180, the similarity search module unit selects a representative silhouette image corresponding to each brand name among silhouette images. In the case of performing a codi, the similarity search module unit places top priority on the brand name or E-Marketplace merchandise name of the keyword information when extracting characteristic information of the silhouette image, derives similar merchandise included in the brand name merchandise group or E-Marketplace merchandise group in the first place, and displays the similar merchandise to users through an avatar.

For example, in the case where a codi image selected by a user is a silhouette image representing a jean, if a keyword Levi's is detected when characteristic information of the silhouette image is extracted, a brand name merchandise group of Levi's is searched in the first place and recommended brand name merchandise corresponding to Levi's is derived. At this point, the characteristic information of the silhouette image has keyword information of Levi's.

At this point, there is a merchandise group of E-Marketplace merchandise, from which the user can be recommended with famous brand name merchandise or E-Marketplace merchandise through a text search or an image search, and therefore brand name merchandise is derived according to the codi items selected by the user.

Next, the silhouette image selected by the user is put on a user avatar. The pattern or the color can be freely converted as the user desires while the avatar is wearing the silhouette image, and the silhouette image can be resized to the size of the avatar. Further, the view of the avatar wearing the silhouette image can be rotated to display the left, right, front, and rear side views of the avatar. In addition, the drapes (an expression of pleats) are also converted to be suitable for the shape of the silhouette image when a pattern mapping is performed, and a view of the avatar wearing the converted silhouette image is displayed on the user computer.

Hereinafter, through the system constructed as shown in FIG. 15 according to the second embodiment of the present invention described above, a method of preferentially recommending the merchandise whose silhouette, pattern, and color are matched will be described referring to FIG. 16. Here, FIG. 16 is a flowchart illustrating a method of preferentially recommending the merchandise whose silhouette, pattern, and color are matched according to the second embodiment of the present invention.

Figure 16:
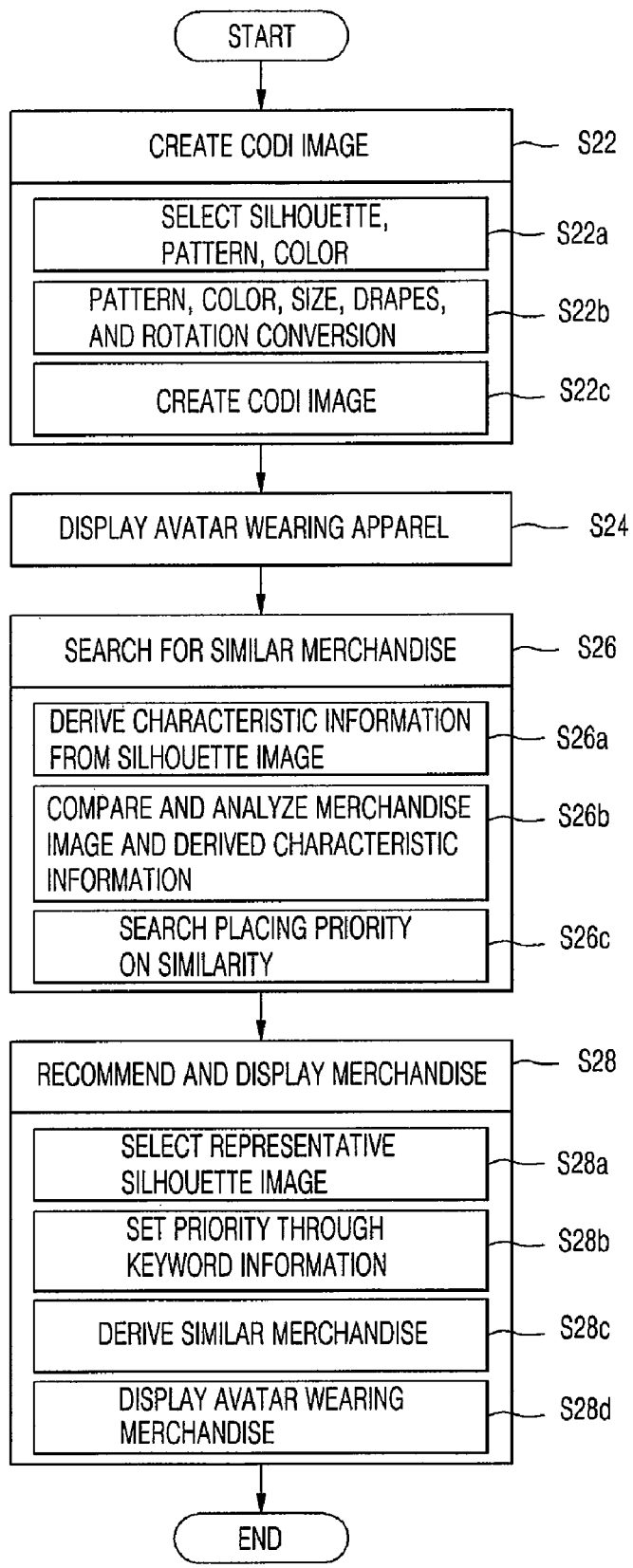
FIG. 16 is a flowchart illustrating a method of preferentially recommending the merchandise whose silhouette, pattern, and color are matched according to a second embodiment of the present invention.

First, as shown in FIG. 16, the codi image creation module unit 170 creates a codi image suitable for the user's taste, inclination, and body shape in order to be recommended with merchandise S22.

That is, describing in detail the step S20 of creating a codi image, first, the selection module 171 selects a silhouette, pattern, and color using the user input information S22a.

The conversion and correction module 172 converts the pattern, color, size, drapes, and rotation of an image in a variety of ways through pattern mapping, color correction, size conversion, rotation conversion, and draping (an expression of pleats) for the selected silhouette, pattern, and color S22b.

Next, the codi image creation module 173 creates a codi image suitable for the user's taste, inclination, and body shape S22c.

The codi image creation module unit 170 displays the created codi image through a user avatar so that the user can confirm the codi image S24.

At this point, the codi image creation module unit 170 can freely convert and correct the pattern or the color as the user desires while the user avatar is wearing the combined silhouette image, and the silhouette image can be resized to the size of the avatar. The view of the avatar wearing the silhouette image can be rotated to display the left, right, front, and rear side views of the avatar.

The similarity search module unit 180 searches for merchandise images that are the same as or similar to the created codi image, using basic information on actually transacted merchandise stored in the merchandise DB or category DB, together with a silhouette image, a pattern image, and silhouette information corresponding to the basic information S26.

Here, describing in detail the step S26 of searching for merchandise images, the similarity search module unit 180 derives characteristic information from the silhouette image S26a, compares the derived characteristic information with the characteristic information of merchandise images S26b, and searches for the same or similar merchandise in order of similarity according to the result of the comparison S26c.

That is, the silhouette image combined by the user is transmitted to the operator server 400, and the operator server 400 extracts characteristic information of the image and recommends similar merchandise using the matching table as described above.

Accordingly, the similarity search module unit 180 recommends and displays the merchandise all of whose silhouette, pattern, and color are matched to the image characteristic information in the first place, the merchandise whose silhouette and pattern are matched in the next place, and the merchandise whose silhouette is matched in the next place S28.

In addition, the similarity search module unit selects a representative silhouette image corresponding to each brand name among silhouette images S28a. In the case of performing a codi, the similarity search module unit places top priority on the brand name or E-Marketplace merchandise name of the keyword information when extracting characteristic information of the silhouette image S28b, derives similar merchandise included in the brand name merchandise group or the E-Marketplace merchandise group in the first place S28c, and displays the similar merchandise to users through an avatar S28d.

While the present invention has been described a merchandise recommending system and a method thereof focusing on avatars and fashion merchandise with reference to the particular illustrative embodiments, it is not to be restricted by the embodiments but only by the appended claims. It is to be appreciated that those skilled in the art can change or modify the embodiments without departing from the scope and spirit of the present invention.

According to the present invention described above, a user can purchase merchandise after extracting image characteristic information through a text search or an image search and confirming recommended merchandise dressed on an avatar having the user's body shape, and thus it is effective in that the user can purchase merchandise suitable for the user's body shape or merchandise that the user desires.

That is, since a user can perform a codi on an avatar that is similar to the user's body shape using recommended merchandise and visually confirm the recommended merchandise, it is effective in that the user can purchase merchandise similar to a desired one through a text search or an image search.

What is claimed is:

1. A method of recommending merchandise, the method comprising the steps of:

receiving, at a server, product information from at least one seller, the product information containing characteristic information of products sold by said at least one seller;

creating and maintaining, by the server, a first database containing product image information associated with a user adaptive avatar image, the product image information including silhouette, pattern and color of products, the user adaptive avatar image representing gender, age or body size of the user;

creating and maintaining, by the first server, a second database containing product information of said at least one seller, the product information including a product image, price and detailed description of the product corresponding to the product image information, the product image being associated with image characteristic information, the image characteristic information including keywords associated with the product;

providing, by a user computer, a first user interface session for allowing the user to create the user adaptive avatar image representing gender, age or body size selected by the user;

providing, by the user computer, a second user interface session for allowing the user to input product image information of products to be searched by selecting virtual graphical images of silhouette, pattern or color of products, the product image information including silhouette, pattern and color of products;

receiving, at the server, a product search request from the user, the product search request including the product image information and product search condition containing characteristic information of products to be searched;

automatically recommending products to a consumer by searching the second database on the server for products by using keywords extracted from said created user adaptive avatar image and said product image information selected by the user so as to generate text search results associated with product images; and arranging, by the server, the automatically recommended products in an order defined by relevance to the product image information of the products received from the user using the image characteristic information extracted through the text search.

2. The method of claim 1, further comprising the step of extracting user-selected product image information of products to be searched, wherein the step of providing a second user interface session includes the steps of:
(a) allowing the user to select a first virtual item of products displayed in a graphical image wherein the first virtual item of products being one selected from the group consisting of silhouette, color and pattern of products;
(b) performing coordinate conversion on size or orientation of the first virtual item of products to fit the user adaptive avatar;
(c) displaying the user adaptive avatar with the first virtual item;
(d) allowing the user to change the first virtual item with a second virtual item of different color, pattern or material;
(e) displaying the user adaptive avatar with the second virtual item; and
(f) repeating the steps (a)-(e) until the user completes fashion coordination for the product search.

3. The method of claim 1, further comprising the step of displaying the ordered search results associated with the user adaptive avatar image.

4. The method of claim 1, further comprising the step of displaying the user adaptive avatar image wearing said selected virtual graphical images of silhouette, pattern or color of products.

5. The method of claim 1, wherein the user adaptive avatar image represents one selected from the group consisting of gender, age, body size, face shape and hair style.

6. The method of claim 1, wherein the second user interface session provides categories of silhouette, pattern or color of products.

7. A method of recommending merchandise, the method comprising the steps of:
receiving, at a server, product information from at least one seller, the product information containing characteristic information of products sold by said at least one seller;

creating and maintaining, by the server, a first database containing product image information associated with a user adaptive avatar image, the product image information including silhouette, pattern and color of products, the user adaptive avatar image representing gender, age or body size of the user;

creating and maintaining, by the server, a second database containing product information of said at least one seller, the product information including a product image, price and detailed description of the product corresponding to the product image information, the product image being associated with image characteristic information, the image characteristic information including keywords associated with the product;

providing, by an user computer, a first user interface session for allowing the user to create the user adaptive avatar image that represents gender, age or body size of the user;

receiving, at the server, a product search request from the user, the product search request including product image information and product search condition containing characteristic information of products to be searched;

providing, by the user computer, a second user interface session for allowing the user to select silhouette information of products to be searched by selecting virtual graphical images of silhouette, color and pattern of products, the silhouette information including silhouette, pattern and color of products, wherein the step of providing a second user interface session includes the steps of:
(a) allowing the user to select a first virtual item of products displayed in a graphical image wherein the first virtual item of products being one selected from the group consisting of silhouette, color and pattern of products;
(b) performing coordinate conversion on size or orientation of the first virtual item of products to fit the user adaptive avatar;
(c) displaying the user adaptive avatar with the first virtual item;
(d) allowing the user to change the first virtual item with a second virtual item of different color, pattern or material;
(e) displaying the user adaptive avatar with the second virtual item; and
(f) repeating the steps (a)-(e) until the user completes fashion coordination for the product search, extracting, by the server, user-selected product image information of products to be searched;

automatically recommending products to a consumer by searching, by the server, the second database on the server for products by using keywords extracted from said created user adaptive avatar image and said product image information selected by the user so as to generate text search results associated with product images; and arranging, by the server, the automatically recommended products in an order defined by relevance to the extracted product image information of the products.

8. The method of claim 7, further comprising the step of displaying the ordered search results associated with the user adaptive avatar image.

9. The method of claim 7, further comprising the step of displaying the user adaptive avatar image wearing said selected virtual graphical images of silhouette, pattern or color of products.

10. The method of claim 7, wherein the user adaptive avatar image represents one selected from the group consisting of gender, age, body size, face shape and hair style.

11. The method of claim 7, wherein the second user interface session provides categories of silhouette, pattern or color of products.

* * * * *